UNITED STATES PATENT OFFICE.

ALEXANDER S. RAMAGE, OF DETROIT, MICHIGAN.

METHOD OF PREPARING SODIUM SULFATE AND COMPOUNDS OF LEAD.

No. 871,066.      Specification of Letters Patent.      Patented Nov. 12, 1907.

Original application filed May 15, 1907, Serial No. 373,715. Divided and this application filed September 21, 1907. Serial No. 393,985.

*To all whom it may concern:*

Be it known that I, ALEXANDER S. RAMAGE, a citizen of the United States, residing at Detroit, in the county of Wayne and State of Michigan, have invented certain new and useful Improvements in Methods of Preparing Sodium Sulfate and Compounds of Lead, of which the following is a specification.

This invention relates to the utilization of lead sulfate, and particularly the material containing lead sulfate and sulfuric acid which constitutes a byproduct of the manufacture of sulfuric acid by the chamber process.

According to the invention the lead sulfate is converted into a basic carbonate under conditions which yield a solution from which pure sodium sulfate may be recovered. The basic carbonate of lead may be utilized as such, or may serve for the preparation of pure solutions for the manufacture of chrome pigments as described in my co-pending pplication, Ser. No. 373,715, filed May 15, 1907, of which the present application is a division. The acid constituents of the byproduct above mentioned and hereinafter referred to as chamber sulfate are utilized in the process.

The invention will be described by reference to the treatment of such chamber sulfate, but it will be understood that it is applicable to the treatment of lead sulfate from other sources by supplying the necessary sulfuric acid.

My preferred procedure is substantially as follows: A suitable quantity, as for instance one ton, of the chamber sulfate, containing as a rule s me ten per cent of free sulfuric acid, is agitated with water in a suitable tank provided with a brass stirring device and suitable heating means, nd is then allowed to settle and the clear liquid decanted, this treatment being preferably repeated several times until the free cid is completely removed. This t eatment applies only to the initial batch of sulfate as will appear hereafter. The washed sulfate is then treated with a solution containing for each pound of metallic lead contained in the sulfat at least 0.26 pounds of sodium hydroxid and 0.175 pounds of sodium carbonate, and the whole is boiled for about fifteen minutes. The sulfate of lead is completely converted into basic lead carbonate having the approximate formula $PbCO_3 2PbH_2O_2$, while the solution contains sodium sulfate, sodium carbonate and some lead. The contents of the tank are then filtered, and the basic carbonate washed with water until freed from sulfates. The alkaline filtrate is run into another tank containing about one ton of chamber sulfate which has not been washed to free it from acid. This free sulfuric acid reacts with the sodium carbonate of the solution rendering the solution acid. In case the chamber sulfate does not contain sufficient free acid to render the solution distinctly acid to litmus paper, further portions of chamber sulfate or of sulfuric acid are added until this condition is attained. The lead held in solution will then be completely precipitated, as lead sulfate is substantially insoluble in a strong saline solution having an acid reaction. The solution, containing only sodium sulfate, together with impurities and a trace of sulfuric acid is then separated from the lead sulfate, and treated as hereinafter described. The sulfate of lead in the tank, being substantially neutral, is then treated without further washing with a solution of sodium hydroxid and carbonate under conditions substantially as above described for the production of further quantities of the basic carbonate. The alkaline solution derived from this second batch of basic carbonate is available for neutralizing further portions of the chamber sulfate.

The slightly acid solution above described, consisting chiefly of sodium sulfate is treated in a suitable tank with a small amount of chlorid of lime to oxidize the impurities, is then neutralized with sodium carbonate, boiled, filtered, and then cooled to about 30 degrees F. Sodium sulfate crystallizes out on standing, and may be separated by means of a hydro-extractor and dried in the usual way to produce anhydrous sodium sulfate.

I claim:

1. The method which consists in reacting on lead sulfate with an alkali metal carbonate and hydroxid to produce basic lead carbonate, acidifying the resulting solution by sulfuric acid to eliminate the lead, and separating sodium sulfate.

2. The method which consists in reacting on lead sulfate with an alkali metal carbonate and hydroxid to produce basic lead carbonate, acidifying the resulting solution by sulfuric acid to eliminate the lead, neutralizing and purifying the solution, and separating sodium sulfate by refrigeration.

3. The method which consists in reacting on lead sulfate with an alkali metal carbonate and hydroxid to produce basic lead carbonate, bringing the resulting solution into contact with chamber sulfate, thereby acidifying said solution and eliminating lead therefrom and abstracting acid from said chamber sulfate, neutralizing and purifying the solution, and separating sodium sulfate by refrigeration.

4. The method which consists in reacting on lead sulfate with an alkali metal carbonate and hydroxid to produce basic lead carbonate, bringing the resulting solution into contact with chamber sulfate, thereby acidifying said solution and eliminating lead therefrom and abstracting acid from said chamber sulfate, converting said sulfate into basic carbonate of lead, neutralizing and purifying the solution, and separating sodium sulfate by refrigeration.

In testimony whereof, I affix my signature in presence of two witnesses.

ALEXANDER S. RAMAGE.

Witnesses:
  WALLACE N. OSBURN,
  HERMAN AHLESON.